June 26, 1962   J. A. OGLE   3,041,462
POSITION INDICATING APPARATUS
Filed Feb. 10, 1959   2 Sheets-Sheet 1

INVENTOR.
JAMES A. OGLE
BY
AGENT

June 26, 1962 — J. A. OGLE — 3,041,462
POSITION INDICATING APPARATUS
Filed Feb. 10, 1959 — 2 Sheets-Sheet 2

INVENTOR.
JAMES A. OGLE
BY
Carl Fissell Jr
AGENT

United States Patent Office 3,041,462
Patented June 26, 1962

3,041,462
POSITION INDICATING APPARATUS
James A. Ogle, Paoli, Pa., assignor to Burroughs Corporation, Detroit, Mich., a corporation of Michigan
Filed Feb. 10, 1959, Ser. No. 792,293
7 Claims. (Cl. 250—219)

This invention relates to indicating apparatus and, more particularly, to automatic apparatus for detecting and indicating the presence of an item such as a sheet or document moving along a transport path. With still more particularity, the invention has to do with apparatus for detecting and indicating the presence or absence of the leading and/or trailing edge of such an item relative to some fixed position along its path of movement.

In item handling and transport apparatus generally the problem exists of determining the precise location of an item such as a sheet of material, within the apparatus or of sensing the presence or absence of a sheet at a particular position within the apparatus. Additionally, there is the problem of sensing the time of arrival of the leading edge or the departure of the trailing edge of the sheet with respect to a particular position or point along its path of movement within a restricted passageway, such for example, as a chute formed between two parallel spaced apart members or plates between which the sheet is moved by suitable means.

In general, it is a relatively simple matter to position a light on one side of a chute or passageway and a light responsive or photo-optical cell type device on the opposite side of the passageway. By directing light across the passageway to the light responsive element, a static light detector system is thus provided. Interruption of the light beam by the leading edge of a sheet produces a signal indicative of the presence of the sheet at that position. As the trailing edge of the sheet passes the device the light responsive element is re-energized by the light again impinging on it indicating that the sheet has passed beyond the detecting device.

As long as sheets consist of flat planar members which are imperforate throughout, the foregoing system works rather well. However, where the sheet is a punched card having a number of perforations, or where the sheet has a multiplicity of small randomly located holes, accidently or otherwise placed therein, the foregoing simple light detection system has certain obvious and pronounced limitations. For example, if, after the beam of light is once interrupted by the passage therethrough of the leading edge of the sheet or card, the light beam is thereafter caused to strike the cell during further passage of the document, by reason of the beam passing through a hole in the card, a spurious signal indicative of the passage of the trailing edge, for example, would be given. Or, if the photo-optical unit is being used as a length measuring device, the simplified detection apparatus will produce an erroneous indication of the length of the card or sheet due to the tears or perforations sensed thereby. Consequently, with items of this type such forms of detecting systems are not satisfactory due to the spurious signals which may be produced thereby.

Another approach to solving the problem of detecting the position of a sheet or its leading and/or trailing edge consists of producing a relatively wide beam of light only a portion of which is sensed by the arrival of a perforation in front of the photo-cell. In effect, the photo-cell in this case is detecting the amount of light received rather than the angle at which the light is received. Such systems as the latter however, also produce problems. They are difficult to make reliable since the presence of even a small portion of the light introduces a critical decision problem into the controlling mechanism of the apparatus, i.e., the control equipment must determine that there is or is not a certain amount, say ½, ¼ or ⅔ etc. of the emitted light being received by the photo-cell and then reset accordingly. Additionally, the document itself may produce spurious signals by radiating or reflecting too little or more than a calculated amount of light to the photo-cell. In order to make the foregoing apparatus accurate, reliable and insensitive to any variations in voltage or the aging of components, the cost of additional equipment required increases the overall cost out of proportion to the resultant effectiveness and efficiency of the machine.

Attempts by mechanical means to solve the foregoing item position detection problems work well at low speeds, but when items are moved into, out of, or through a system at high speed, at a rate of 400" per second, for example, the known mechanical devices are unable to operate accurately, reliably or efficiently at such high speeds.

It is an important object of the present invention therefore to provide means for solving the foregoing problems in a relatively simple, easy and inexpensive fashion.

Another important object of the invention is to provide a photo-optical light sensitive item detection system.

It is another important object of the present invention to provide an automatic mechanism for indicating the relative position of a sheet of material within sheet handling apparatus while the sheet is moving therein at a relatively high rate of speed.

It is a further object of the present invention to provide a photo-optical light sensitive sheet detection system which is completely self-contained and which does not require adjustment once it is installed within the apparatus.

It is another object of the invention to provide a beam of light detection apparatus which will accurately indicate the relatively position of the leading and/or trailing edge of a sheet with respect to a predetermined fixed position regardless of the physical condition of the sheet.

In accordance with the foregoing objects and first briefly described herein the invention comprises an indicating and detecting mechanism in the form of a self-contained unitary assembly having means for generating radiant energy and for directing said radiant energy as a beam of light angularly with respect to the pathway of a moving object such as a paper sheet whereby the light beam is caused to cross the sheet pathway in a reflected zig zag pattern finally impinging upon a light sensitive mechanism within said assembly. Interruption of the beam by the passage of the sheet therethrough causes the light sensitive mechanism to produce a signal output which may be used for various purposes, such as indicating the arrival of the sheet's leading and/or trailing edge at a predetermined point along its path of movement. Reimpingement of the light beam upon the light responsive mechanism as the sheet passes beyond the light beam pattern causes a signal output indicating the departure of the trailing edge of the sheet. Elimination of the possibility of a spurious signal output caused by mislocated punched holes, tears or other physical deformation of the item substantially increases the operating efficiency and accuracy of the detection apparatus. In the figures:

Figure 3:
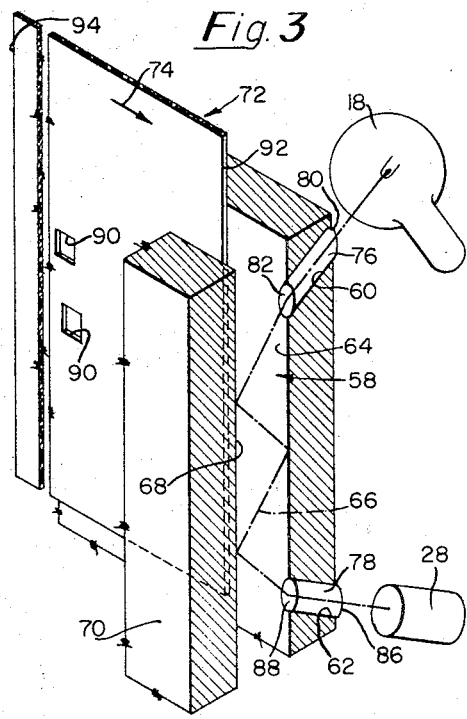
Figure 4:
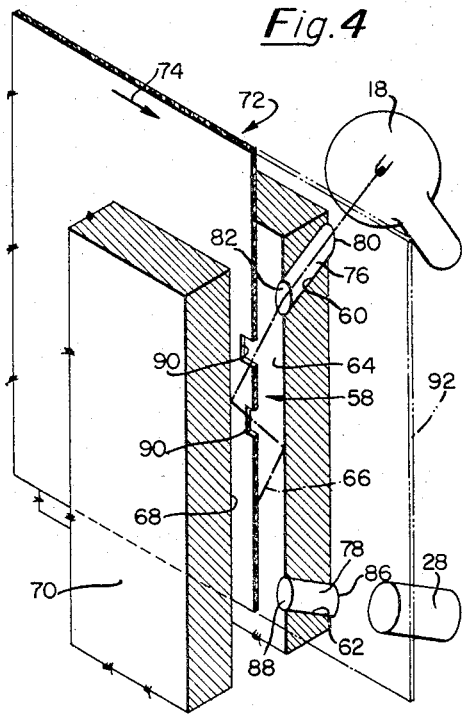
Figure 5:
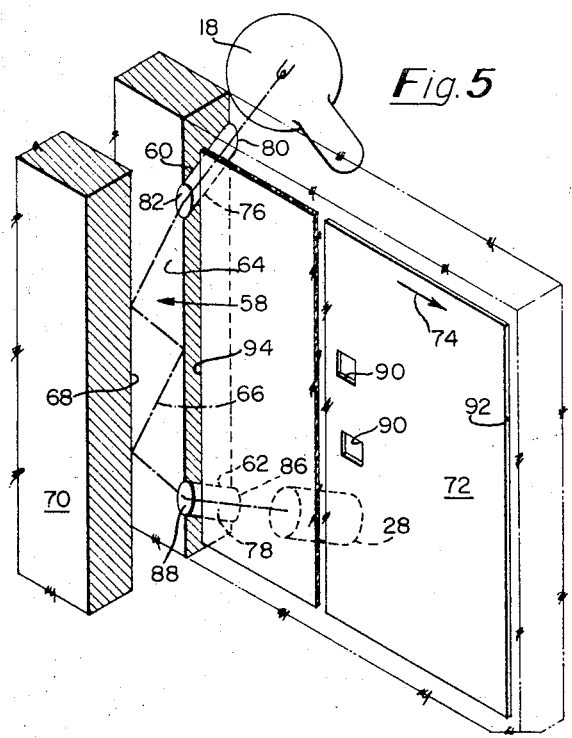
Figure 6:
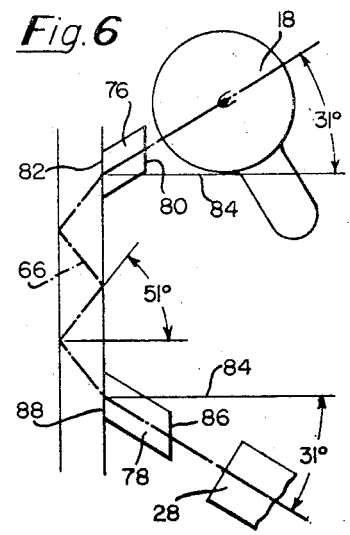

FIGS. 3, 4 and 5 are diagrammatic isometric sectional views of the present invention illustrating various operational characteristics of the invention such as a leading edge indication, a multiple hole situation, and a trailing edge indication respectively; and FIG. 6 is a diagrammatic illustration to show the zigzag path of the light beam with respect to the sheet guideway and the light responsive member used therewith.

In the presently illustrated embodiment of the invention, a photo-optical, light responsive position detecting and indicating apparatus is utilized to indicate the position of an item or the position of various portions of an item during the passage of the item through the apparatus.

Figure 1:
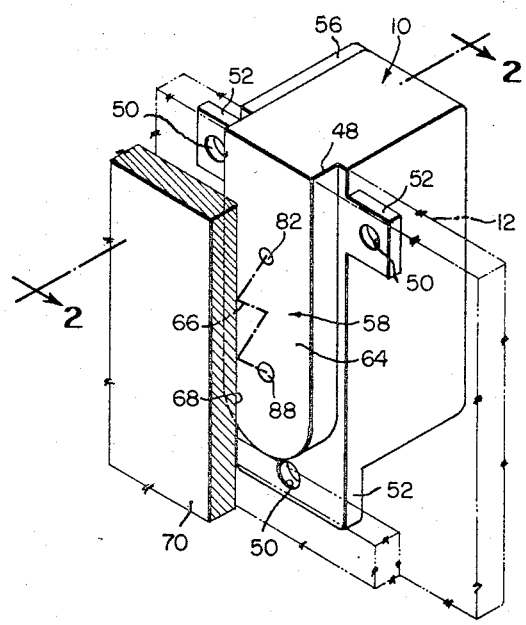
FIG. 1 is an isometric view of the preferred embodiment of the present invention.

Referring to FIG. 1 there is shown a unitary self-contained photo-optical assembly 10, disposed for example, in a supporting member such as wall 12, indicated by broken lines. The physical disposition and location of the optical assembly 10 is a matter of design choice dictated for the most part by the end use to which the detector is to be put. As shown most clearly in FIG. 2, the item position indicating device includes a compartmented structure or housing having two substantially contiguous hollow chambers 14 and 16. Chamber 14 is provided with a light bulb 18 which is adapted to be energized from a suitable source of electrical current 20 by closing switch 21 (FIG. 2) over the leads 22. The bulb is supported within the chamber in any suitable fashion as by means of a three pronged clamp 24 secured to the chamber wall by means of screw 26.

Chamber 16 is adapted to receive and support a photosenser or light sensitive element 28, e.g. a photo-cell, which is adapted to be energized by means of the bulb 18 as will now be explained. A relay 30 having an armature 32 biased by spring 34 away from the coil 36 is connected to the cell 28 over the leads 38. Output control signals are derived from element 28 over these same leads 38, to energize lamp 40, in circuit wtih electrical source 42, as will be explained later on. The light sensitive cell 28 is supported by means of a sleeve 44 into which it is press-fitted and which is attached to the wall of chamber 16 by means of the screw 46.

Figure 2:
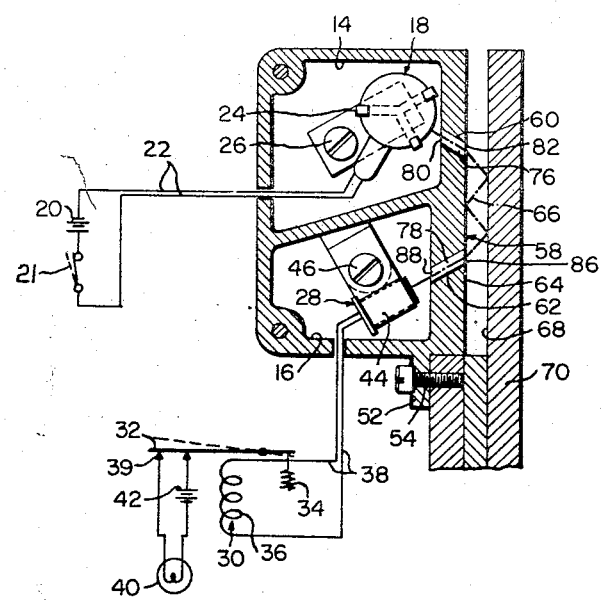
FIG. 2 is a side elevational view taken along the line 2—2 of FIG. 1.

The assembly 10 is positioned within an aperture 48 (FIG. 1), formed in wall member 12, by means of locating holes 50 in projecting flanges 52 and bolts 54 only one of which is shown (FIG. 2). A cover member 56 is attached to the chambered assembly 10 in any suitable manner, as by screws not shown, and is adapted to effectively seal the chamber from the ingress of ambient light or dirt and dust.

Referring to FIGS. 2–5 it is seen that front wall portion 58 of the sensing assembly 10 is provided with spaced apertures 60 and 62 opening into chambers 14 and 16 respectively. Aperture 60 is slanted at an angle with respect to the outer surface 64 of wall 58, while aperture 62 is oppositely slanted with respect to this same surface 64, such that the light beam 66 projects outwardly from bulb 18 at an angle of approximately 31° to the perpendicular, while the reflected light is received by the photo-optical sensing device at an angle of 31° from the perpendicular, as shown most clearly in FIG. 6.

By means to be described subsequently, the beam of light 66 is bent or refracted as it leaves aperture 60 and again as it enters aperture 62. The beam of light is further angularly oriented with respect to the two apertures, as will be described presently by using the outer face 64 of wall 58 as one light reflective surface and the inner face 68 of side wall member 70 as the other reflecting surface. Both reflecting surfaces preferably are polished to a mirror finish. FIGS. 3 and 4 illustrate that, when the beam of light from bulb 18 is directed through upper aperture 60 in assembly 10, and against the highly polished reflective surface 68, the refractive means previously mentioned in combination with the two reflecting surfaces causes the light to be reflected backwardly to the front polished surface 64 of the photosensing device from which it is again reflected to surface 68 and and again reflected backwardly to pass through aperture 62 to be picked up or sensed by the photo-optical device 28. In this fashion, the light beam zigzags across the narrow, confined passageway or slot formed between the two parallel side wall members, i.e., transverse to the horizontal direction of movement of an item. An item or sheet, such as document 72, moving in the direction of the arrow 74, FIG. 4, traverses the narrow passage between walls 12 and 70 and interrupts the light beam so that its position is sensed or detected while it is in motion.

Apertures 60 and 62 are made relatively small in diameter to prevent the occurrence of a single reflection of the light from the surface of item 72 to cell 28 if an item should pass through the passageway close to or hugging the far wall 70.

As mentioned earlier, optical refracting members are incorporated in each aperture, as will now be described. Referring to FIGS. 3 and 6, and first more particularly to FIG. 3, there is shown an upper refracting member 76 of glass, plastic or any suitable transparent material having the desired index of refraction, disposed within the opening 60 in the wall 58 of the assembly. A lower refracting member 78 having a substantially similar refractive index is located in the opening 62 in wall 58. In this embodiment the members 60 and 62 are cylindrically shaped for ease in fabrication and handling, and, as before mentioned, are angularly offset with respect to each other and to the surfaces 64 and 68. The inner and outer surfaces 80 and 82 respectively, of member 60, as seen in FIG. 6, are substantially parallel to one another so that the light rays are deflected from their straight line path and bent or refracted to emerge from member 60 at an angle of 51° to the perpendicular line 84 as shown. The beam 66 is thus caused to ricochet back and forth in the earlier described zig-zag pattern at angles of 51° relative to the reflecting surfaces 64 and 68 passing finally through member 78, the inner and outer surfaces 86 and 88 respectively, of which are also parallel to one another, to impinge upon cell 28.

The sheet position indicating assembly 10, as illustrated here, is located along the item pathway relative to a common sensing area for each item such that the leading and/or trailing edge of any item entrained between wall members 12 and 70 must pass through and interrupt the zig-zag light beam. In this fashion, it is assured that the beam of light reflected back and forth between the two side walls will be interrupted by an item passing therebetween.

By thus causing the light beam to flow through a zig-zag path before striking the light sensitive member, the efficiency and accuracy of the apparatus is increased, as will now be described, by substantially eliminating the possibility of a spurious signal output due to erroneously or inaccurately located punched holes, tears or other undesirable deformation of the document.

Referring particularly to FIGS. 3 and 5, it is seen that when an item 72 having a series of punched holes 90 therein, and entrained between the walls 12 and 70 passes its leading edge 92 through the zig-zag light beam 66, the light will be interrupted. Interruption of the beam of light in the foregoing manner de-energizes the photo-cell 28 by blocking off the light thereto. Spring 34 of relay 36 now drops out the armature 32 opening contacts 39 and shutting off current to the light 40 indicating that the leading edge 92 of the item has passed this point in the apparatus.

As the item continues its movement past the photo-optical assembly 10 as shown in FIG. 5, the trailing edge 94 finally passes beyond the zig-zag light beam path causing the beam to reimpinge on the cell 28. Simultaneously therewith, cell 28 generates an electrical output causing coil 36 to pull-in the armature 32 closing contacts 39. This operation re-establishes a current path from the power source 42 to the lamp 40, lighting the lamp and indicating that the trailing edge 94 of the item has passed beyond the assembly 10.

It is apparent from FIG. 4 that even though the item may have a plurality of holes 90 therein, the multiple path, zig-zag light beam herein described, prevent spurious trailing edge signals by preventing the light beam from reaching the photo-cell 28 until such time as the actual trailing edge 94 of the item passes the cell.

Under ordinary circumstances the likelihood of having multiple punched holes 90 in a sheet or document in such alignment or orientation as to permit light beam 66 to pass through each of the holes in succession, reflect off the walls of the assembly and again reflect off the opposite side wall 68 and back onto the photo-cell 28, is for all purposes, impossible. There is no known card system utilizing a combination of punched holes which would produce such a situation. For the known punched hole combinations generally encountered in business operations, the herein described quadruple light beam path will produce an accurate and efficient item position signal indication while preventing the accidental generation of spurious signals.

Since items 72 may be handled by sheet feeding apparatus at extremely high speeds, e.g., approximately 400″ per second, in item sorters, for example, it is desirable that the item position indicating means be operable at a comparable rate of speed so that the position of each item can be separately indicated without error. A grossly stacked batch of items such as random sized sheets of paper, bank checks, deposit slips, punched cards, etc. which may have been spindled, dog-earred, mishandled, over-printed, etc. have various coefficients of friction with respect to each other and to the feeding apparatus. By positioning a number of item position detectors of the herein described type adjacent but in spaced apart relation to each other along an item path a sufficient gap is provided between items to insure that two sheets do not overlap, etc. However, due to these varying coefficients of friction, sheets may or may not be accurately spaced apart from each other as required in order to prevent missorts and jams.

These and other sorting and handling problems may be solved by the present invention by placing a number of item detectors along the pathway at distances approximately equivalent to the length of the longest item. If the trailing edge indication of a first item does not follow a leading edge indication within a certain time limit, then, through electrical circuitry, not shown, the apparatus can be conditioned to indicate an overlap situation. Or, if the leading edge of a sheet arrives at the second detection station before the trailing edge has passed the previous detection station, the apparatus is conditioned to an over-length sheet situation. Suitable circuitry, not forming a part of this invention may be provided to cause equipment to operate in accordance with such conditions. For example, in place of the lamp 40 there could be substituted a switching mechanism which is electrically connected to the sorting and handling apparatus so as to energize and deenergize said apparatus in response to the output from the detection device of the present invention.

What is claimed is:

1. Automatic item sensing apparatus comprising, photo-sensitive light responsive means positioned adjacent the path of movement of said item, light generating means for activating said photo-sensitive means, means operatively associated with said light responsive means and said light generating means for reflectively directing light from said light generating means in an angularly disposed zig-zag path across the path of movement of said item to said photo-sensitive member, and means associated with the light responsive and light generating means respectively for angularly altering terminal portions of said zig-zag path thereby to increase the angular relationship between the intersecting paths of light effectively compressing the relative spacing between said light responsive means and said light generating means.

2. Automatic sensing apparatus comprising, throat forming guides disposed in parallel spaced apart relationship and having opposed confronting light reflecting surfaces, photo-optical light responsive means disposed in one of said guides, light generating means also disposed in said one of said guides and displaced from said light responsive means, means for connecting said light generating means to a source of electrical energy, and optical light transmitting means for angularly deflecting the path of the light from said light generating means into the throat formed by the guides so that the light is reflected from said light reflecting surfaces in a zig-zag path across said throat and into said photo optical means intercepting the path of movement of a sheet adapted to be transported therethrough.

3. A photo-optical device comprising, a unitary housing having first and second compartments separated by a light impervious wall, a source of light within said first compartment, a light sensitive unit in said second compartment, a first aperture in one wall of said housing extending at an angle from said first compartment toward said second compartment, a second aperture in said wall extending at an angle from said second compartment toward said first compartment, a reflective surface on said wall between said apertures, reflective means positioned facing said housing wall, whereby light from said source passes through said first aperture and is angularly reflected in a zig-zag path, first from said reflective means to the reflective surface on said wall, from said surface again to said reflective means, and then through said second aperture to said light sensitive unit, and light transmitting and refracting means for compressing said zig-zag path of light.

4. A construction in accordance with claim 3 wherein said wall of said housing and said reflector means form a guideway through which items may be directed to intercept said beam of light as it moves through said zig-zag path, and means responsive to the interception of said beam of light to indicate the presence of said items.

5. A photo-optical device comprising, a first side wall member, a second side wall member spaced apart from and parallel to said first side wall member, said first and second side wall members together forming an item passageway through which sheet items are adapted to be transported, one of said side wall members being provided with an opening therein, a compartmented receptacle disposed in said opening and having one surface portion lying flush with the adjacent contiguous surfaces of said side wall member, said receptacle being provided with a pair of apertures in a wall portion thereof, said apertures being angularly offset and opening outwardly toward the opposite side wall member, light generating means disposed in one of the compartments of said receptacle, light responsive means disposed in the other compartment of said receptacle, refracting means disposed in one of said apertures whereby the light entering the aperture from the light beam is bent as it passes out of said aperture, refracting means in said other aperture whereby the entering light is bent as it passes into said other aperture to said light responsive means whereby said light generating means and said light responsive means are closely juxtaposed within said receptacle, the angular disposition of said apertures and said refracting means with the opposite side wall member being such that the radiant energy is directed in a zig-zag pattern across the space between said first and second side wall members thus to intersect the path of movement of said item at a plurality of places and finally impinging upon said light responsive means, and means responsive to the interruption of said light pattern to indicate the presence of an item when the item interrupts said zig-zag pattern.

6. A photo-optical device comprising, a first side wall member, a second side wall member spaced apart from and parallel to said first side wall member, said first and second side wall members together forming an item passageway through which sheet items are adapted to be transported, one of said side wall members being provided with an opening therein, a compartmented receptacle disposed in said opening and having one wall portion thereof flush with the surrounding portions of said side wall member, said receptacle being provided with a pair of apertures therein, said apertures being angularly offset and opening outwardly toward the opposite side wall member into said passageway, light generating means disposed in one of the compartments of said receptacle, means to direct a beam of light from said light generating means through said aperture toward said passageway at a first angle relative to the walls of said passageway, means in said first aperture to bend said beam into said passageway at a second angle relative to the walls of said passageway, means on the wall of said passageway to reflect said beam in a zig-zag path through said passageway and into said second aperture, light sensitive means disposed in the other of the compartments of said receptacle, means in said second aperture to bend said light beam at a third angle toward said light sensitive means, said first and third angles being such that said light generating means and said light sensitive means are closely juxtaposed, and means connected to said light sensitive means and responsive to the interruption of said beam to indicate the relative position of said item in said device.

7. Apparatus for detecting leading and trailing edges of a sheet item passing through a guideway wherein said item contains a predetermined pattern of holes therein in rows and columns comprising, a pair of closely spaced parallel walls forming a guideway through which said items are passed, one of said walls being provided with an opening therein, a photo-optical assembly disposed in said opening, said assembly comprising a unitary housing having a first and second compartment therein separated by a light impervious wall, one wall of said housing being flush mounted in said wall aperture, a source of light in said first compartment, a light sensitive unit in said second compartment, a first aperture in one wall of said compartment, a second aperture in the same wall of said compartment, means in said first aperture refracting the light from said light source as the light passes through said aperture, means in said second aperture to refract the light as it passes through said second aperture to impinge on said light sensitive unit, means responsive to said item passing through said beam to indicate said leading and said trailing edges of said item, said first and second apertures being angularly related to the guideway formed by said wall members such that a beam of light leaving the light source and entering the passageway is directed through said passageway at an angle relative to a line normal to said passageway greater than the angle at which the light beam enters the passageway, whereby said light source and said light sensitive element are closely spaced together and said light beam forms a zig-zag pattern defining a multi-directional path out of phase with the pattern of holes through said item, said item thus being effective to actuate said last means only at the leading and trailing edges of said item.

References Cited in the file of this patent

UNITED STATES PATENTS

| | | |
|---|---|---|
| 1,848,874 | Fitzgerald | Mar. 8, 1932 |
| 2,171,362 | Gulliksen | Aug. 29, 1939 |
| 2,577,564 | Borden | Dec. 4, 1951 |
| 2,606,297 | Sweet | Aug. 5, 1952 |
| 2,692,952 | Briggs | Oct. 26, 1954 |
| 2,753,464 | Stone | July 3, 1956 |